US010631466B2

(12) United States Patent
Kanchibhotla et al.

(10) Patent No.: US 10,631,466 B2
(45) Date of Patent: Apr. 28, 2020

(54) CHIPPER SHREDDER

(71) Applicant: Harbor Freight Tools USA, Inc., Calabasas, CA (US)

(72) Inventors: Srikanth Kanchibhotla, Thousand Oaks, CA (US); Wes Harmelink, Newberry Park, CA (US)

(73) Assignee: HARBOR FREIGHT TOOLS USA, INC., Calabasas, CA (US)

( * ) Notice: Subject to any disclaimer, the term of this patent is extended or adjusted under 35 U.S.C. 154(b) by 464 days.

(21) Appl. No.: 15/457,806

(22) Filed: Mar. 13, 2017

(65) Prior Publication Data

US 2017/0258014 A1 Sep. 14, 2017

Related U.S. Application Data

(60) Provisional application No. 62/307,231, filed on Mar. 11, 2016.

(51) Int. Cl.
| | | |
|---|---|---|
| *A01G 3/00* | (2006.01) | |
| *B02C 18/18* | (2006.01) | |
| *B02C 18/22* | (2006.01) | |
| *B27L 11/02* | (2006.01) | |
| *B02C 18/14* | (2006.01) | |

(52) U.S. Cl.
CPC ............. *A01G 3/002* (2013.01); *B02C 18/14* (2013.01); *B02C 18/18* (2013.01); *B02C 18/2216* (2013.01); *B02C 18/2291* (2013.01); *B27L 11/02* (2013.01); *B02C 2018/147* (2013.01)

(58) Field of Classification Search
CPC ............... B02C 18/18; B02C 18/14–2018/147
See application file for complete search history.

(56) References Cited

U.S. PATENT DOCUMENTS

| | | | | |
|---|---|---|---|---|
| 2,352,127 A | * | 6/1944 | Sheldon .............. | B02C 13/2804 172/555 |
| 2,943,687 A | * | 7/1960 | Merry .................. | A01B 33/028 172/123 |
| 3,243,944 A | * | 4/1966 | Michaud .............. | A01D 34/733 56/295 |
| 4,317,544 A | * | 3/1982 | Lapointe .............. | B02C 18/143 144/176 |
| 4,346,764 A | * | 8/1982 | Rossi ................... | A01B 33/028 172/123 |
| 4,421,176 A | * | 12/1983 | Tuggle ................. | A01B 33/027 172/112 |
| 4,651,510 A | * | 3/1987 | Malutich ............. | A01D 34/733 56/13.4 |

(Continued)

*Primary Examiner* — Sean M Michalski
(74) *Attorney, Agent, or Firm* — Tarter Krinsky & Drogin LLP

(57) ABSTRACT

Exemplary embodiments of a chipper shredder are provided. In some exemplary embodiments, the chipper shredder can include a rotor disc having an obverse side and a reverse side, one or more chipper blades provided on the obverse side, one or more impeller blades provided on the reverse side, the one or more impeller blades being perpendicular to the rotor disc, one or more hammer blades on the reverse side, the one or more hammer blades being substantially parallel to the rotor disc, and one or more L-blades on the reverse side that extend outwardly and upwardly from a center of the rotor disc.

10 Claims, 10 Drawing Sheets

(56) References Cited

U.S. PATENT DOCUMENTS

| | | | | |
|---|---|---|---|---|
| 4,824,034 A * | 4/1989 | Baker | B02C 13/04 | 241/101.2 |
| 4,834,302 A * | 5/1989 | Baker | B02C 13/04 | 241/101.78 |
| 4,907,750 A * | 3/1990 | Seifert | B02C 13/04 | 241/189.1 |
| 5,056,605 A * | 10/1991 | Bond | A01B 1/065 | 172/111 |
| 5,085,376 A * | 2/1992 | Litchenburg | B02C 18/14 | 241/56 |
| 5,102,056 A * | 4/1992 | Ober | B02C 13/04 | 241/100 |
| 5,156,345 A * | 10/1992 | Baker | B02C 13/02 | 241/101.78 |
| 5,279,466 A * | 1/1994 | Williams | B02C 23/32 | 209/139.1 |
| 5,291,725 A * | 3/1994 | Meinerding | A01D 34/005 | 56/255 |
| 5,385,308 A * | 1/1995 | Gearing | B02C 18/143 | 241/101.78 |
| 5,390,865 A * | 2/1995 | Vandermolen | B02C 13/04 | 241/101.76 |
| D357,482 S * | 4/1995 | Forbush | D15/17 | |
| 5,603,459 A * | 2/1997 | Gearing | B02C 18/143 | 241/101.78 |
| 5,605,291 A * | 2/1997 | Doskocil | B02C 13/04 | 241/194 |
| 5,669,563 A * | 9/1997 | Gearing | B02C 18/143 | 241/101.71 |
| 5,707,017 A * | 1/1998 | Paolucci | A01G 3/002 | 241/55 |
| 5,960,619 A * | 10/1999 | Seidel | A01D 34/005 | 56/17.5 |
| 6,027,055 A * | 2/2000 | Doskocil | B02C 18/143 | 241/225 |
| 6,257,511 B1 * | 7/2001 | Turner | B02C 18/143 | 241/296 |
| 6,474,575 B1 * | 11/2002 | Gramling, III | B02C 18/22 | 241/30 |
| 6,494,027 B1 * | 12/2002 | Firdaus | A01G 20/47 | 56/16.7 |
| D518,491 S * | 4/2006 | Vaughn | D15/28 | |
| 7,171,798 B1 * | 2/2007 | Bernardy | A01D 34/73 | 56/255 |
| 7,552,884 B2 * | 6/2009 | Gross | A01G 3/002 | 144/162.1 |
| 7,798,436 B2 * | 9/2010 | Cornelius | A01G 3/002 | 241/298 |
| 7,878,434 B2 * | 2/2011 | Grant | B02C 18/184 | 241/101.76 |
| 7,882,774 B1 * | 2/2011 | Bernardy | B23D 61/021 | 30/276 |
| 8,739,843 B2 * | 6/2014 | Helmsderfer | A01G 23/067 | 144/24.12 |
| 9,120,103 B2 * | 9/2015 | Amornpimol | B02C 21/02 | |
| 10,257,971 B2 * | 4/2019 | Kittelson | A01B 1/065 | |
| 2005/0023388 A1 * | 2/2005 | Reinhold | B02C 18/083 | 241/92 |
| 2010/0101099 A1 * | 4/2010 | Morabit | A01D 34/416 | 30/347 |
| 2019/0046990 A1 * | 2/2019 | Walcutt | B27G 21/00 | |

* cited by examiner

CHIPPER SHREDDER

CROSS-REFERENCE TO RELATED APPLICATIONS

This application relates to and claims priority from U.S. Provisional Patent Application Ser. No. 62/307,231 filed Mar. 11, 2016, the entire disclosure of which is hereby incorporated herein by reference.

FIELD OF THE DISCLOSURE

The present disclosure relates to exemplary embodiments of a chipper shredder, and more particularly, to exemplary embodiments of a rotary assembly for a chipper shredder.

BACKGROUND OF THE DISCLOSURE

Chipper shredders are garden and landscape accessories used to reduce a variety of items such as leaves, twigs, small branches, cardboard, etc., to smaller pieces. Typically, a chipper/shredder is provided with a hopper to receive materials to be shredded, macerated or otherwise reduced and a hopper throat to guide the materials towards high speed, rotating, macerating elements.

Various disadvantages are found in these chipper shredders, including relying solely on the apertures behind the blades as the only means of passing material from one side of the blade to the other, material getting stuck to the surface of the obverse disc face and needing to be periodically removed, cutting surfaces or blades that are inefficient, processed material being discharged in a haphazard and unguided manner, the unwanted use of a collection bag, and the difficulty of capturing ejected material.

At least one of the objects of the exemplary embodiments of the present disclosure is to reduce or address the deficiencies and/or limitations described herein above, by providing a chipper shredder that does not suffer from these deficiencies.

SUMMARY OF EXEMPLARY EMBODIMENTS OF THE DISCLOSURE

At least some of the above described problems can be addressed by exemplary embodiments of the methods and systems according to the present disclosure. Exemplary embodiments of a chipper shredder can be provided for, in which a chipper shredder is provided, which comprises a rotor disc having an obverse side and a reverse side, one or more chipper blades provided on the obverse side, one or more impeller blades provided on the reverse side, the one or more impeller blades being perpendicular to the rotor disc, one or more hammer blades on the reverse side, the one or more hammer blades being substantially parallel to the rotor disc, and one or more L-blades on the reverse side that extend outwardly and upwardly from a center of the rotor disc.

In some exemplary embodiments, the one or more hammer blades have at least one chiseled edge. In some exemplary embodiments, at least one of the one or more L-blades have two chiseled edges. The one or more hammer blades can be provided above the one or more impeller blades on the reverse side of the rotor disc. The one or more L-blades can be provided above the one or more hammer blades on the reverse side of the rotor disc.

In some exemplary embodiments, the one or more impeller blades can extend from approximately a center portion of the rotor disc to approximately a circumferential edge of the rotor disc. The one or more impeller blades can have a height that is greater at the center portion of the rotor disc than a height at the circumferential edge of the rotor disc. The height of the one or more impeller blades can gradually decreases from the center portion of the rotor disc to the circumferential edge of the rotor disc. The one or more hammer blades can be rotatably fixed on the reverse side of the rotor disc. The L-blades can be fixed on the reverse side of the rotor disc.

In some exemplary embodiments, a chipper shredder is provided, comprising a rotor disc having an obverse side and a reverse side, a groove provided approximate a circumferential edge of the obverse side of the rotor disc, the groove having a length between a first end a second end, a hole provided approximate the circumferential edge of the obverse side of the rotor disc, wherein the second end of the groove terminates in the hole, wherein a depth of the groove increases from the first end to the second end.

In some exemplary embodiments, the chipper shredder can further comprise one or more chipper blades provided on the obverse side of the rotor disc, the one or more chipper blades being configured to cut material as it first enters the chipper shredder. The chipper shredder can further comprise at least one aperture provided approximate the one or more chipper blades, wherein the material passes from the obverse side of the rotor disc through the at least one aperture to the reverse side of the rotor disc. In some exemplary embodiments, the chipper shredder can further comprise one or more additional grooves provided between the aperture approximate the one or more chipper blades and the hole.

In some exemplary embodiments, the length of the groove can follow a rotation of the rotor disc. The length of the groove can follow the rotation of the rotor disc such that the first end of the groove is provided at an earlier part of the rotation of the rotor disc and the second end of the groove is provided at a later part of the rotation of the rotor disc. In some exemplary embodiments, four grooves can be provided approximate the circumferential edge of the obverse side of the rotor disc, each groove having a length between a first end a second end, and four holes are provided approximate the circumferential edge of the obverse side of the rotor disc, wherein the second end of each groove terminates in the hole, wherein a depth of each groove increases from the first end to the second end of the respective groove.

In some exemplary embodiments, a chipper shredder is provided, comprising a rotor assembly for chipping and shredding material provided into the chipper shredder, a discharge port for discharging the material from the rotor assembly, and a discharge port cover provided on the discharge port, the discharge port cover having an upper surface configured to receive the material ejected from the discharge port and guide the material in a downward direction away from the upper surface of the discharge port cover. The upper surface can have a curved rectangular shape and two side surfaces each connected to the upper surface along an upper portion of each side surface. The discharge port cover can be rotatably mounted to the discharge port and is configured to cover the discharge port.

In some exemplary embodiments, the chipper shredder can further comprise a retention mechanism provided on the discharge port and the discharge port cover for retaining a discharge bag for the ejected material. The retention mechanism can comprise a hook and a cleft provided along a portion of the discharge port, and a rabbet provided along a portion of the discharge port cover. The hook and cleft can be provided along a bottom portion of the discharge port, and the rabbet can be provided on an upper portion of the discharge port cover.

BRIEF DESCRIPTION OF THE DRAWINGS

The foregoing and other objects of the present disclosure will be apparent upon consideration of the following detailed description, taken in conjunction with the accompanying drawings and claims, in which like reference characters refer to like parts throughout, and in which:

Figure 1:
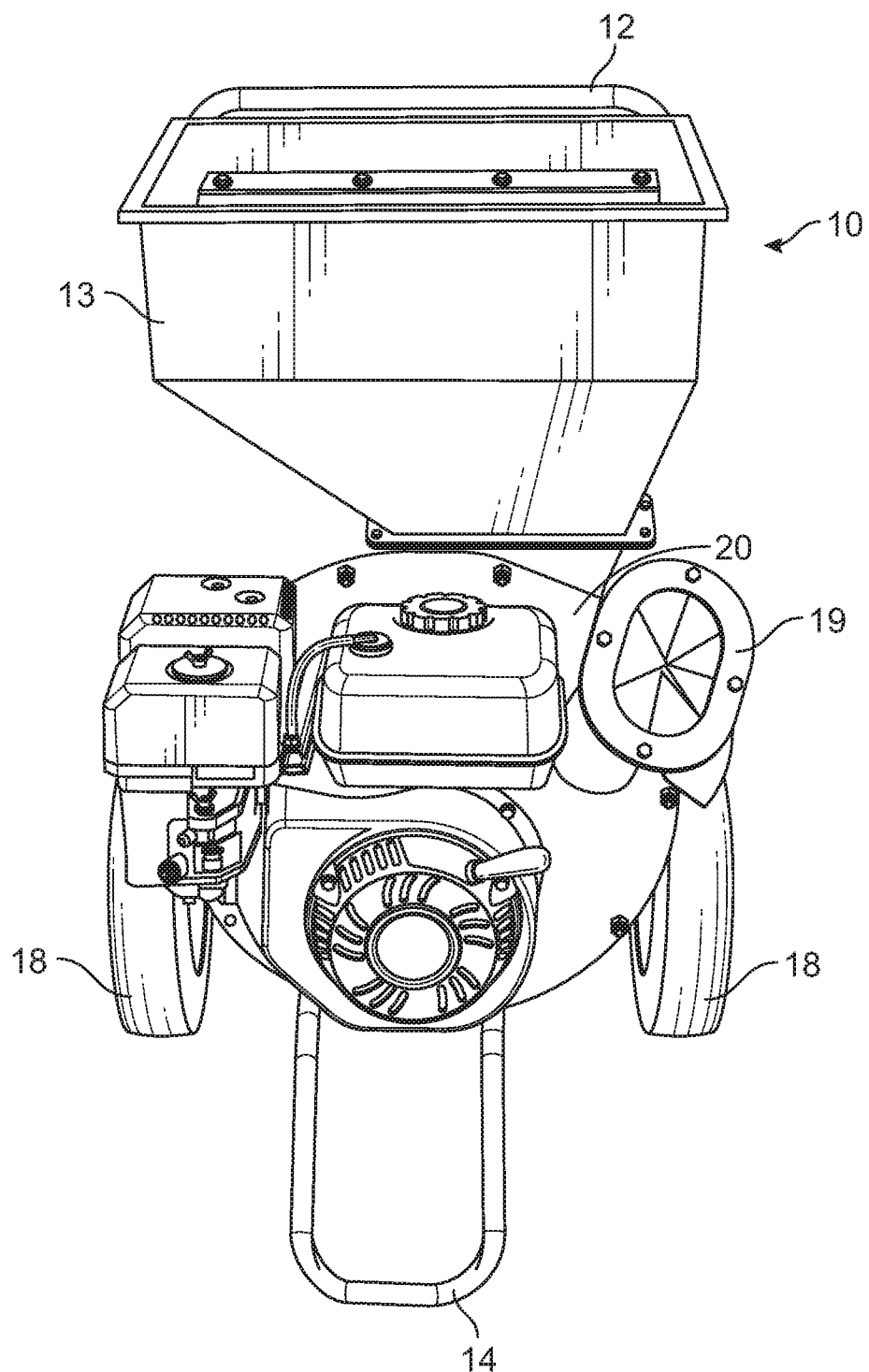
FIG. 1 is a front view of a chipper shredder according to an exemplary embodiment of the present disclosure.
Figure 2:
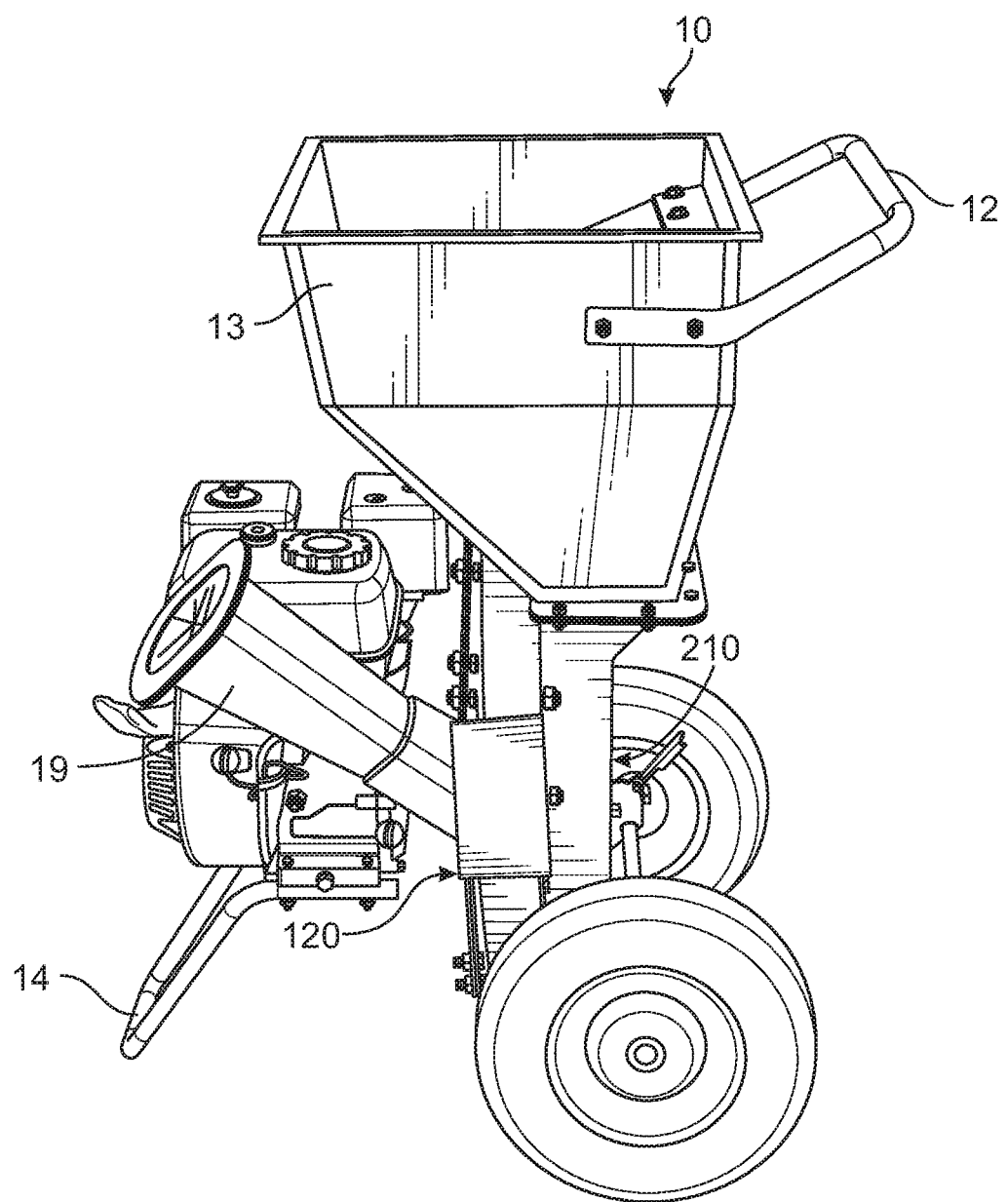
FIG. 2 is a first side view of a chipper shredder according to an exemplary embodiment of the present disclosure.
Figure 3:
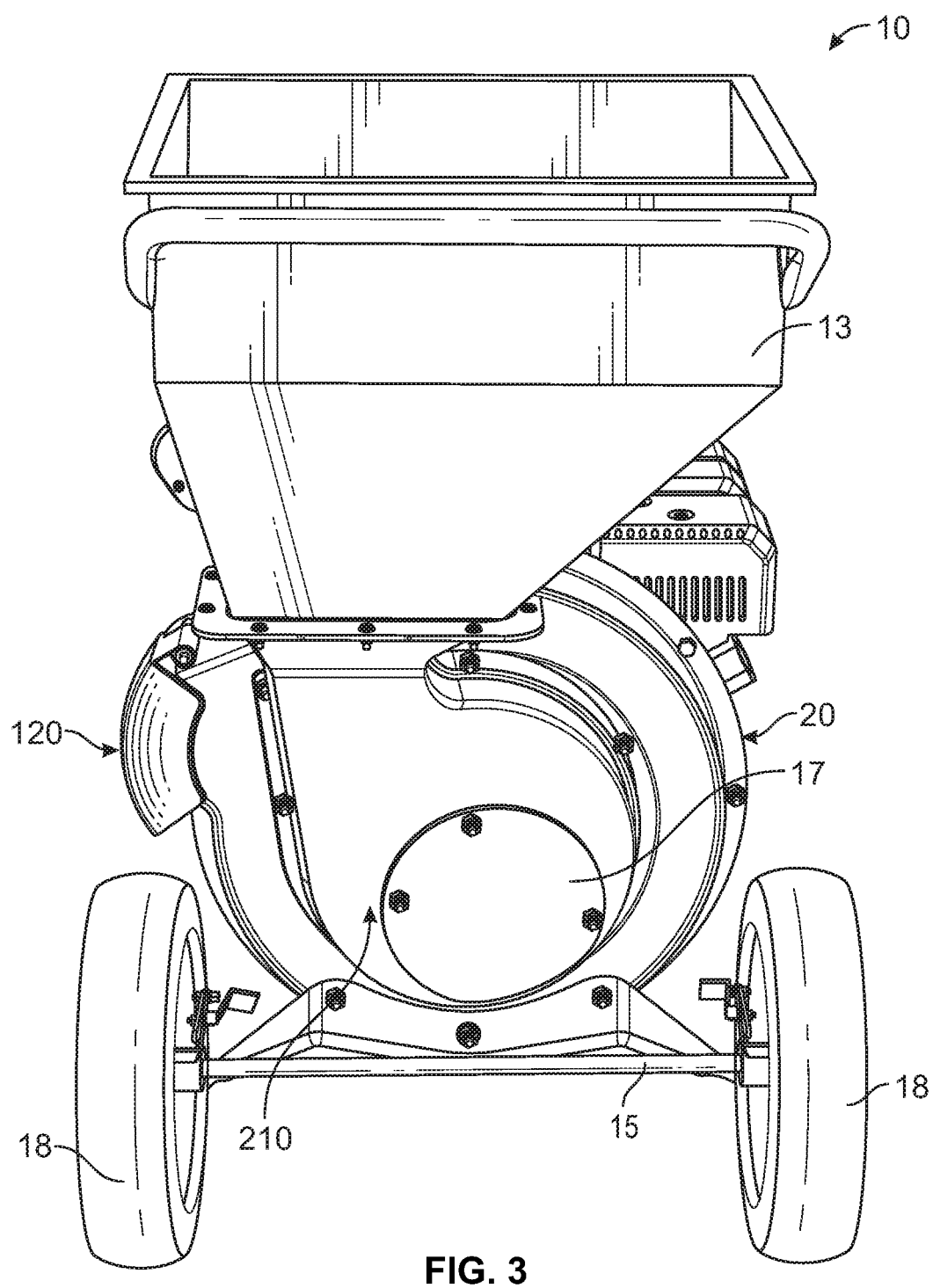
FIG. 3 is a rear view of a chipper shredder according to an exemplary embodiment of the present disclosure.
Figure 4:
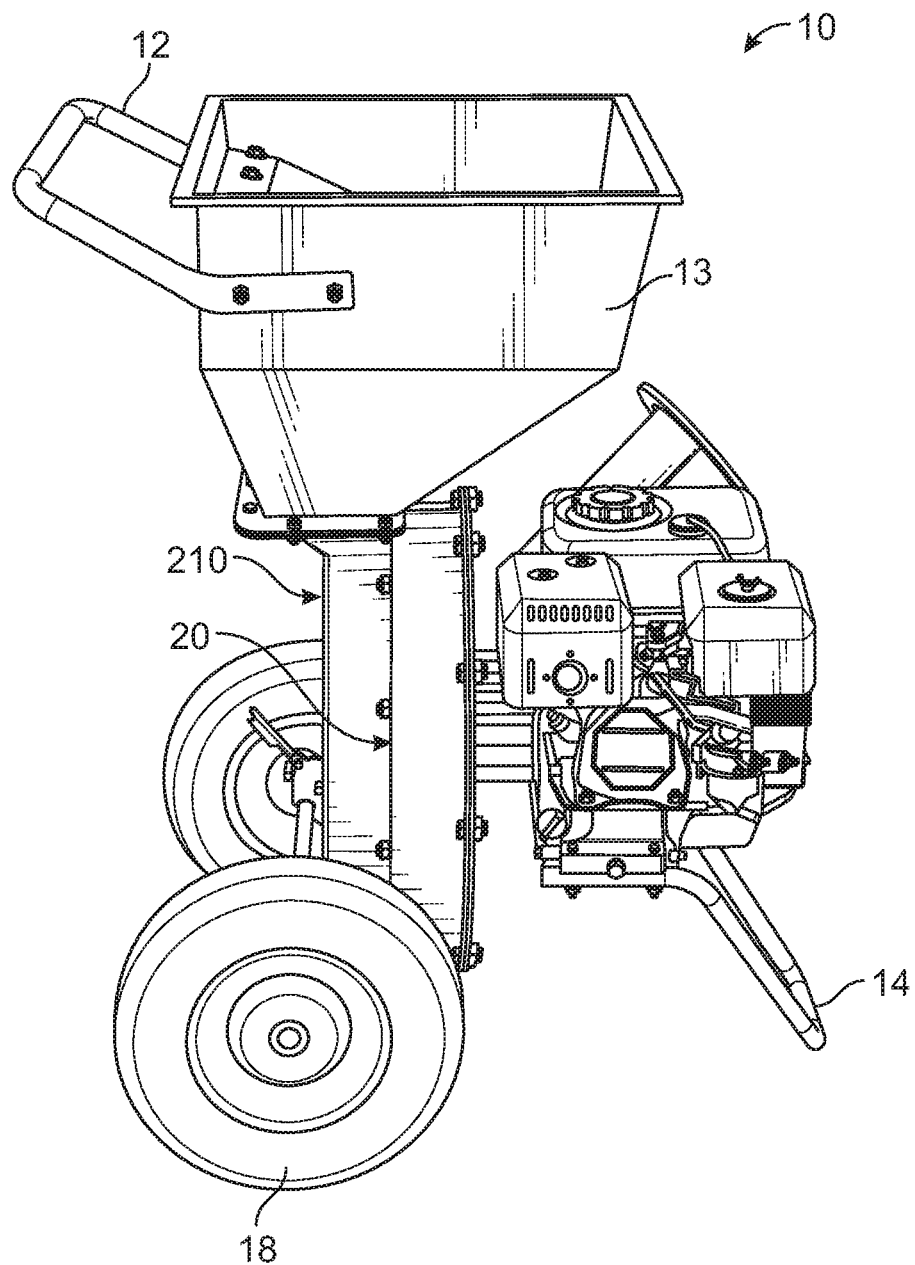
FIG. 4 is a second side view of a chipper shredder according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

Exemplary embodiments of the apparatuses and methods of the present disclosure will now be described with reference to the figures. The following description of the various embodiments is merely exemplary in nature and is in no way intended to limit the scope of the disclosure, its application, or uses.

Referring to FIGS. 1-4, a chipper shredder 10 can be provided having a main housing 20, a hopper 13 above the main housing 20, a top handle 12 connected to the hopper 13, one or more wheels 18 provided on an axle 15 below the main housing, and a support leg 14 provided below the main housing 20 opposite the wheels 18. The wheels 18 can have wheel locks to lock the wheels 18. The hopper 13 can have a hopper flap (not shown). The chipper shredder 10 can also have a chipper chute 19 that can have a chipper chute flap.

The main housing 20 can further include a rotor housing 210, which can be provided at a rear of the chipper shredder 10, and a discharge port cover 120. An access panel 17 can be provided on the rotor housing 210. The rotor housing 210 can house a rotor assembly 200 and the discharge port cover 120 can be a part of a discharge assembly 100, discussed in further detail below.

Figure 5:
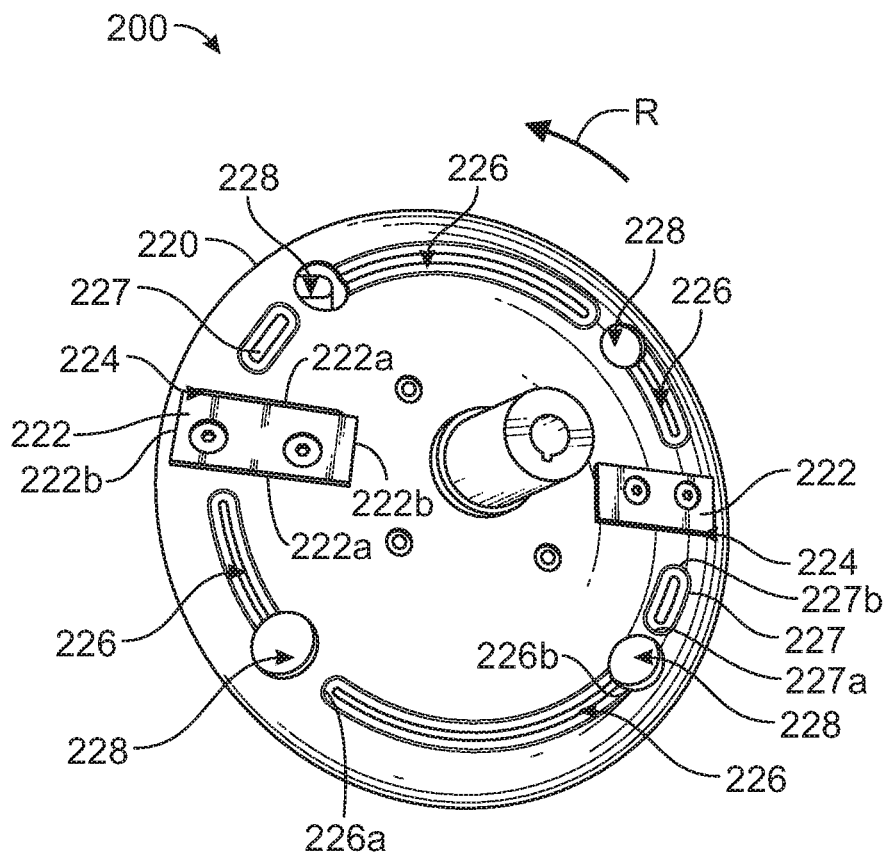
FIG. 5 is a view of an obverse side of a rotor disc of a chipper shredder according to an exemplary embodiment of the present disclosure.
Figure 6:
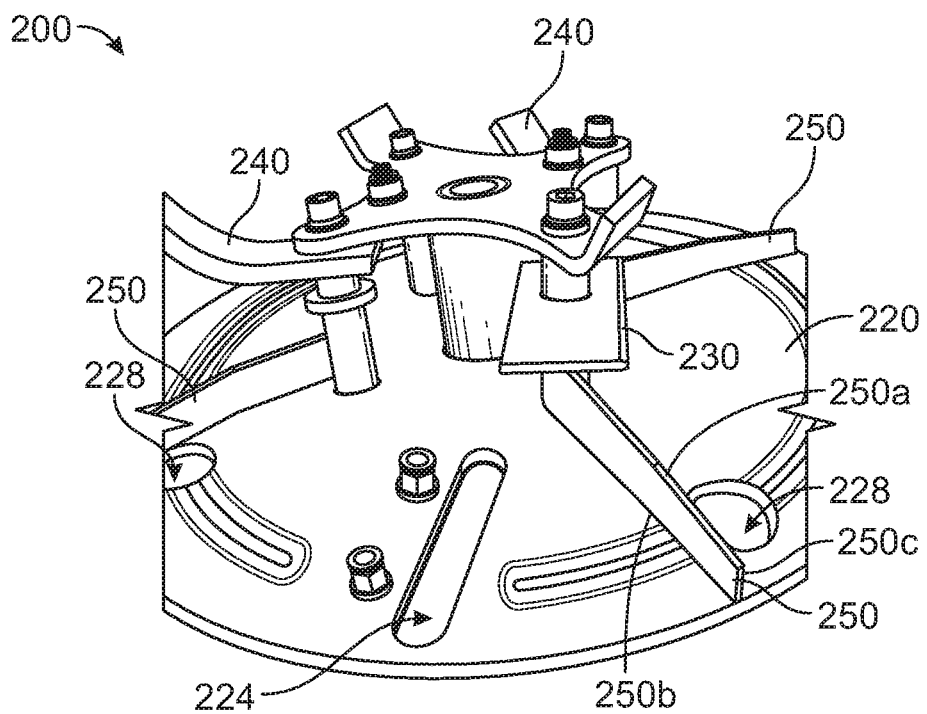
FIG. 6 is a view of a reverse side of a rotor disc of a chipper shredder according to an exemplary embodiment of the present disclosure.

Referring to FIGS. 5-6, a rotor assembly 200 in the rotor housing 210 can include a rotor disc 220. The rotor disc 220 can include an obverse side as shown in FIG. 5, and a reverse side as shown in FIG. 6. As shown in FIG. 5, the obverse side of the rotor disc 220 can have two chipper blades 222, but can include less or more chipper blades and is not restricted to any number of chipper blades. The chipper blades 222 can be any type of blade and made of any material, and can be of a rectangular configuration, but are not limited to any particular shape, and can be triangular, circular, trapezoidal or various other shapes according to the exemplary embodiments of the present disclosure. The chipper blades 222 can have a cutting edge provided on a portion of or on the entire length of any of the long edges 222a and short edges 222b around the periphery of the chipper blades 222. In some exemplary embodiments, the chipper blades 222 can have a cutting edge on each of the long edges 222a and short edges 22b to provide a cutting surface throughout the entire periphery of the chipper blades 222.

Material can first enter the obverse side of the rotor disc 220 as it enters the chipper shredder 10 through, e.g., the chipper chute 19. In some exemplary embodiments, beneath each of the chipper blades 222 is an aperture 224 through which initially chipped material passes through to reach the reverse side of the rotor disc 220, where it can be further chipped and shredded. In some exemplary embodiments, apertures 224 can be provided approximate the longer edges 222a of the chipper blades 222.

In some exemplary embodiments, on the obverse side of the rotor disc 220, there can be a combination of grooves 226 and holes 228. Each groove 226 can include one or more grooves, and can start at a location independent of a hole 228 and near a circumferential edge of the rotor disc 220, traverse for a length following a rotation R of the rotor disc 220, and terminate at a hole 228. In some exemplary embodiments, the depth of a groove 226 can increase as it approaches the hole 228. For example, the groove 226 and hole 228 configuration can be designed to follow the direction of rotation R of the rotor disc 220, such that a shallow end 226a of the groove 226 can be at an earlier point of rotation R and that a deeper end 226b of the groove 226 and hole 228 can be at a later point in the rotation R. Such a groove 266 and hole 228 structure can prevent jamming in the chipper shredder 10.

In some exemplary embodiments, the rotor assembly 200 can have but is not limited to four groove and hole combinations located equidistant on the rotor disc 220 and reside near a circumferential edge of the rotor disc 220. The groove and hole structure is not limited to any particular number of grooves 226 or holes 228, and any number of groove and hole structures are contemplated in the present disclosure. The holes 228 can be in any number and in any shape, radius, multiple radii, or graduating radii on the rotor disc 220. Each groove 226 can vary in depth, width or length along the circumferential edge of the rotor disc 220. The groove and hole structure can provide for material that is cut/shredded/broken off, and still residing on the obverse side of the rotor disc 220, to be directionally guided to the reverse side of the rotor disc 220 for appropriate chipping and shredding.

In some exemplary embodiments, there can be additional grooves 227 provided on a circumferential edge of the rotor disc 220, which can be provided between the chipper blade 22 and a hole 228. Each additional groove 227 can comprise one or more grooves. Each additional groove 227 can vary in depth, width or length along the circumferential edge of the rotor disc 220. In some exemplary embodiments, the ends 227a, 227b of the additional grooves 227 can be independent of the aperture 224 and the holes 228 (i.e., not touching). In some exemplary embodiments, one end 227b of the additional grooves 227 can terminate in an aperture 224 and one end 227a can terminate in a hole 228. In addition to guiding material to the reverse side of the rotor disc 220, the grooves 226 and the additional grooves 227 can provide an air channel to lift wet or green material from the surface of the rotor disc 220, thereby allowing material to flow to the reverse side of the rotor disc 220.

As shown in FIGS. 6-9, L-blades 240, hammer blades 230, and impeller blades 250 can reside on or be adjacent to the reverse side of the rotor disc 220. The L-blades 240, hammer blades 230, and impeller blades 250 can be any number or types of blades, any can be constructed of any material and of any configuration, and are not limited to any particular number, material or shape. In some exemplary embodiments, the L-blades 240, hammer blades 230, and impeller blades 250 can be one or more of a square, rectangular, triangular, circular, trapezoidal, polygonal or various other shapes or configurations according to the exemplary embodiments of the present disclosure. The L-blades 240, hammer blades 230, and impeller blades 250 can have a cutting surface provided on a portion of or on an entire length of a cutting edge on the respective blade, as described more fully below.

In some exemplary embodiments, material can pass from the obverse side of the rotor disc 220 to the reverse side of the rotor disc 220 through the holes 228 and apertures 224. The impeller blades 250 can extend outwardly from approximately a center portion of a surface of the reverse side of the rotor disc 220 to approximately a circumferential edge of the rotor disc 220, along a surface of the rotor disc 220. Each impeller blade 250 can have a top surface 250a, a bottom surface 250b provided on the rotor disc 220, and a side surface 250c approximate the circumferential edge of the rotor disc 220. In some exemplary embodiments, either or both of the top surface 250a and the side surface 250c can have a cutting surface provided on a portion or entire length of the top surface 250a and the side surface 250c, respectively.

As shown in FIG. 6, the impeller blades 250 can be perpendicular to the surface of the rotor disc 220. In some exemplary embodiments, four impeller blades 250 can be provided on the surface of the rotor disc 220 equidistant from each other along a rotational edge of the rotor disc 220, and the exemplary embodiments of the present disclosure are not limited to any particular number of impeller blades. The impeller blades 250 can be rectangular in cross-section, but are not limited to any particular shape according to the exemplary embodiments of the present disclosure.

Figure 7:
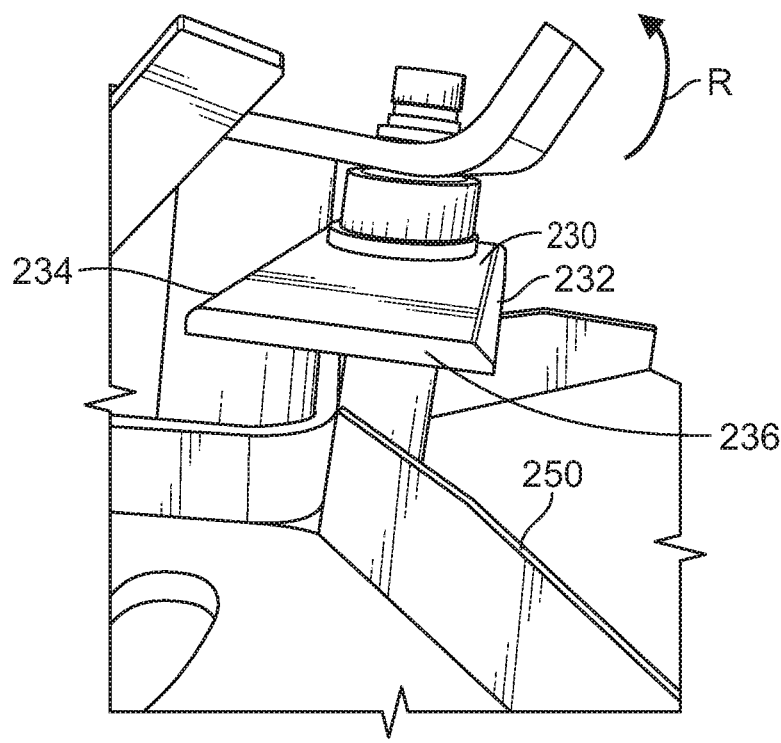
FIG. 7 is a view of a hammer blade of a rotor assembly of a chipper shredder according to an exemplary embodiment of the present disclosure.

The hammer blades 230 of the chipper shredder 10 can be rotatably affixed to the rotor assembly 200, and provided above the impeller blades 250. As shown in FIG. 7, the hammer blades 230 can have a side surface 232, side surface 234 and a side surface 236. In some exemplary embodiments, a portion or the entire length of the side surface 232 can be chiseled to provide a chiseled edge 232 along a leading edge, as determined by the rotation R of the rotor disc 220, such that it can have the ability to chip and shred material rather than only macerating it. This feature can provide for wood material to be already cut before the wood material reaches the L-blades 240. In some exemplary embodiments, the hammer blades 230 can have edges on both side surfaces 232, 234 be chiseled edges, or on all three side surfaces 232, 234 and 236 be chiseled edges. A portion or an entire length of the sides surfaces 232, 234 and 236 can be chiseled. The hammer blades 230 can be of a rectangular configuration but are not limited to any particular shape, and can be square, triangular, circular, trapezoidal, polygonal or various other shapes according to the exemplary embodiments of the present disclosure. The hammer blades 230 can be substantially parallel to the surface of the rotor disc 220. In some exemplary embodiments, two hammer blades 230 can be provided on the chipper shredder at approximately opposite locations along a circumference of the rotor disc 220, and the exemplary embodiments of the present disclosure are not limited to any particular number of hammer blades 230.

Figure 8:
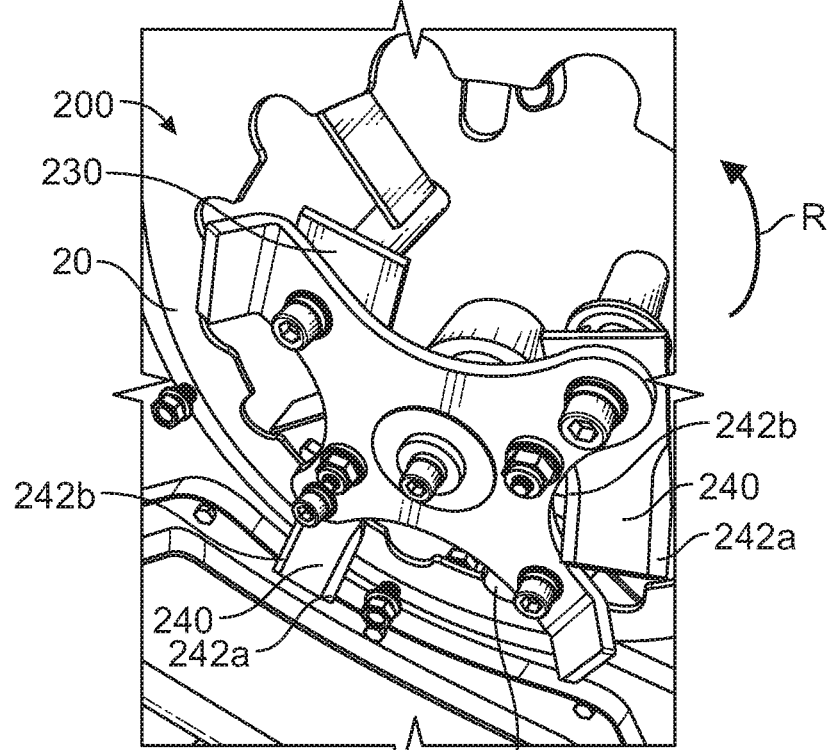
FIG. 8 is a view of a reverse side of the rotor assembly including an L-blade and hammer blade of a chipper shredder according to an exemplary embodiment of the present disclosure.
Figure 9:
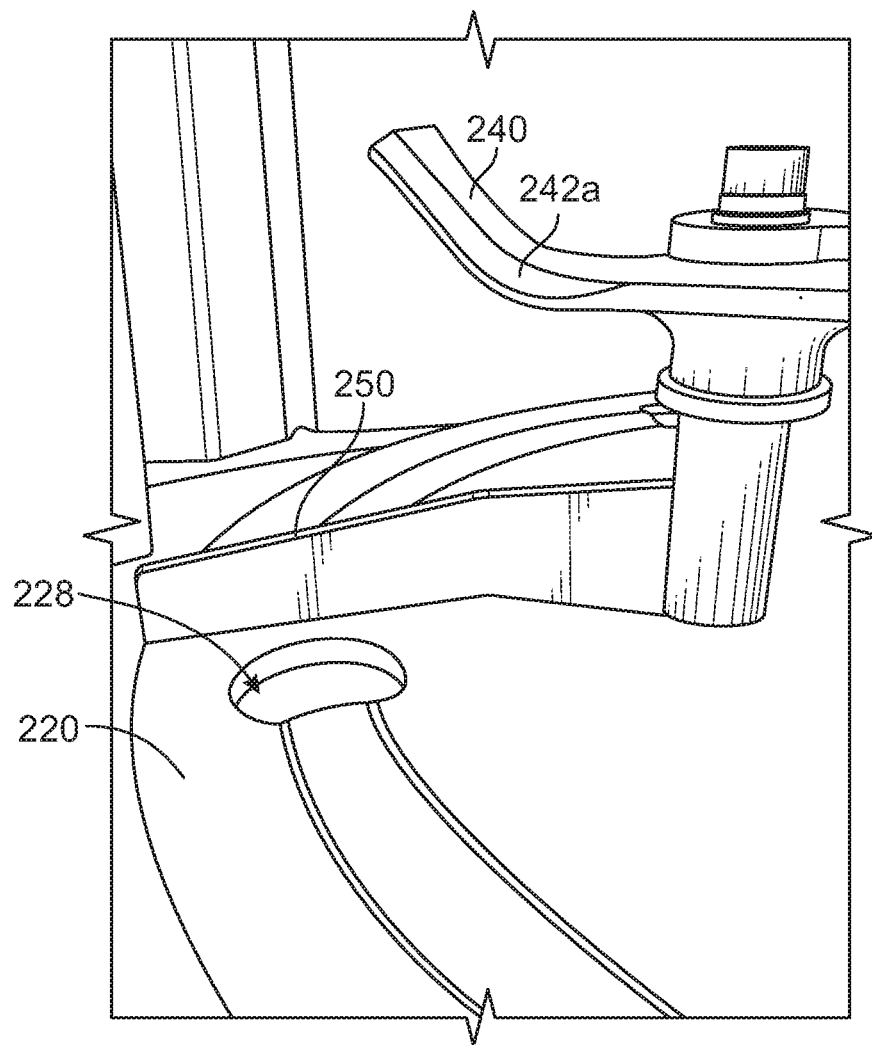
FIG. 9 is a view of a reverse side of the rotor assembly including an L-blade and an impeller blade of a chipper shredder according to an exemplary embodiment of the present disclosure.

Referring now to FIGS. 8-9, the L-blades 240 of the chipper shredder 10 can be operationally affixed and at rest in the rotor assembly 200. The hammer blades 230 can have a chiseled edge along one or more side surfaces that, as discussed above, cuts, chips and shreds, as well as macerates, the material. The L-blades 240 of the chipper shredder 10 can face the back of the rotor housing 210 and cut the material even further. The L-blades 240 can have a chiseled edge on a portion or entire length of a leading side surface 242a, or a chiseled edge on a portion or entire length of both the leading side surface 242a and trailing side surface 242b. The L-blades 240 can extend upward and outwardly from the surface of the rotor disc 220. In some exemplary embodiments, each of the L-blades 240 can face the same direction. The L-blades 240 can have a trapezoidal cross-section, and are not limited to any particular shape according to the exemplary embodiments of the present disclosure.

The chipper shredder 10 can have two L-blades 240, which can be provided at approximately opposite locations along a circumference of the rotor disc 220, and in some exemplary embodiments, can have four L-blades 240 provided at equidistant locations along a circumference of the rotor disc 220, and are not limited to any particular number according to the exemplary embodiments of the present disclosure. The L-blades 240 can cut, chip and shred material resulting in a finer and more consistent product and a more efficient machine. Additionally, having the two L-blades 240 face the same direction can result in a more efficient use of construction materials, a better housing design, and reduction of possibility of injury from, e.g., a burn.

In some exemplary embodiments, having both L-blades 240 face the back of the rotor housing 210 provides less wear and tear on the main housing 20. The placement of the L-blades 240 facing the back of the rotor housing 210 instead of the main housing 20 allow the L-blades 240 to have smaller pieces of wood to cut (having been cut by the hammer blades 230), have smaller pieces that are less likely to be caught between the rotor housing 210 and the L-blades 240, and less likely to cause damage to the body of the chipper shredder 10.

In some exemplary embodiments, as shown in FIG. 9, one or more impeller blades 250 can be provided on a surface of the rotor disc 220. In some exemplary embodiments, multiple impeller blades 250 can be provided. The impeller blades 250 can efficiently and completely guide material from the center of the rotor disc 220 outwardly to the circumferential edge of the rotor disc 220, and through the discharge port 110. The impeller blades 250 can be approximately or substantially perpendicular to the surface of the rotor disc 220, and can have a greater height near the center of the rotor disc 220 and a shorter height near the circumferential edge of the rotor disc 220. The height of the impeller blades 250 can gradually decrease from near the center of the rotor disc 220 as it extends to near the circumferential edge of the rotor disc 220. This can help the removal process in getting the material out of the chipper shredder 10. The impeller blades 250, L-blades 240 and hammer blades 230 can provide a hammer, chop and mulch function of the chipper shredder apparatus 10.

Figure 10:
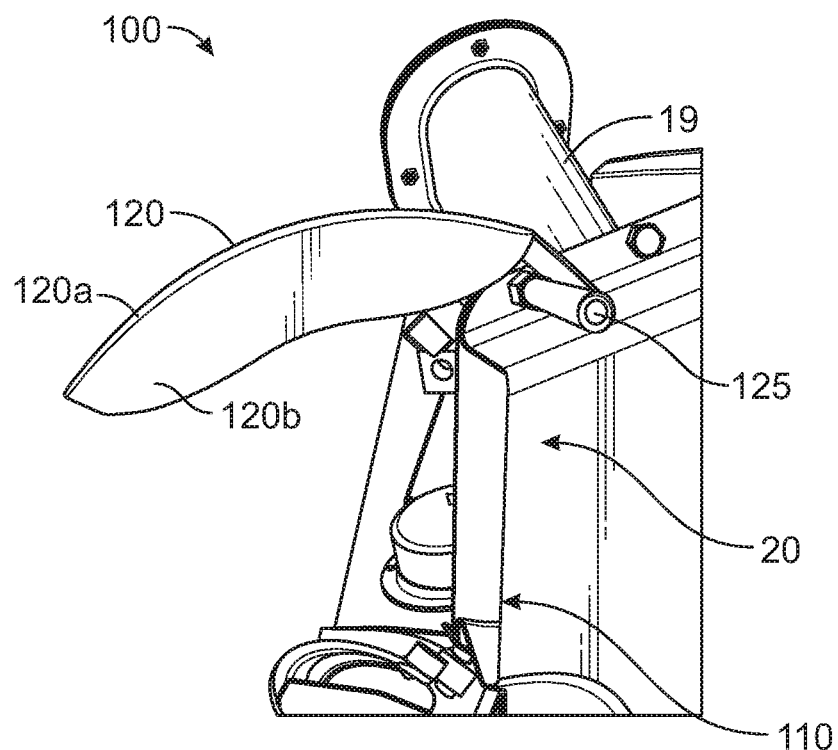
FIG. 10 is a view of a discharge port and a discharge port cover of a chipper shredder according to an exemplary embodiment of the present disclosure.
Figure 11:
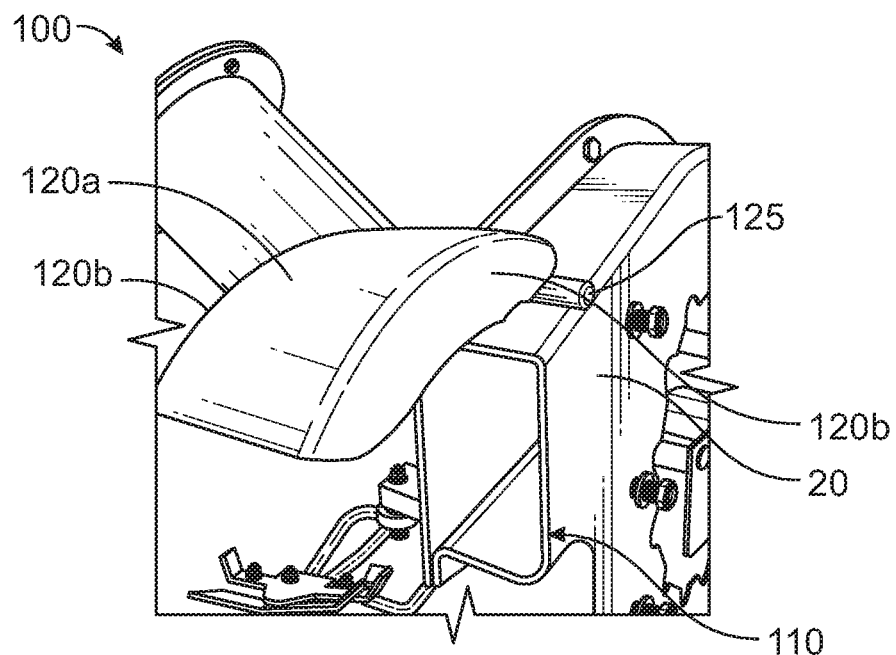
FIG. 11 is a view of a discharge port and a discharge port cover of a chipper shredder according to an exemplary embodiment of the present disclosure.

FIGS. 10-11 illustrate a discharge assembly 100 of the chipper shredder 10. The rotor assembly 200 can eject the processed material through a discharge port 110. The discharge port 110 can eject material from the main housing 20 in a guided, straight line and in a generally downward direction. In some exemplary embodiments, the discharge port 110 can have a discharge port cover 120. The discharge port cover 120 can have several functions, including providing a cover to the discharge port 110 when the chipper shredder 10 is not in use and to guide and impact the direction of the material ejected from the discharge port 110. The discharge port cover 120 can be rotatably mounted to the main housing 20 through pivot element 125.

In some exemplary embodiments, the discharge port cover 120 can have but is not limited to the shape of a segment of a circular disc. The upper surface 120a that impacts vertical movement of the discharge material can be rectangular in shape and curved along its length, and as the upper surface 120a also encompasses the top portion that is removably and rotatably affixed to the rotor housing 210, the entire piece can be one curved rectangular element. The upper surface 120a is not limited to any particular shape or configuration, and can be of various shapes and configurations that can cover the discharge port cover and guide the ejected material downward according to the exemplary embodiments of the present disclosure.

The two side surfaces 120b can each be affixed to the length of the upper surface 120a, and can each be shorter in length than the upper surface 120a. The two side surfaces 120b can each be curved along their top portions so as to form a complete join with the upper surface 120a, and can be a single unitary element in some exemplary embodiments. The two side surfaces 120b can have a first portion at one end of the upper surface 120a, and extend to a second portion at a second opposite end of the upper surface 120a, before the point where the upper surface 120a is rotatably affixed to the main housing 20 at pivot element 125. The width of each of the side surfaces 120b can be noticeably shorter, which allows the discharge port cover 120 of the present disclosure to fully close against the discharge port 110 without being prevented by any other fixture on the chipper shredder 10.

Figure 12:
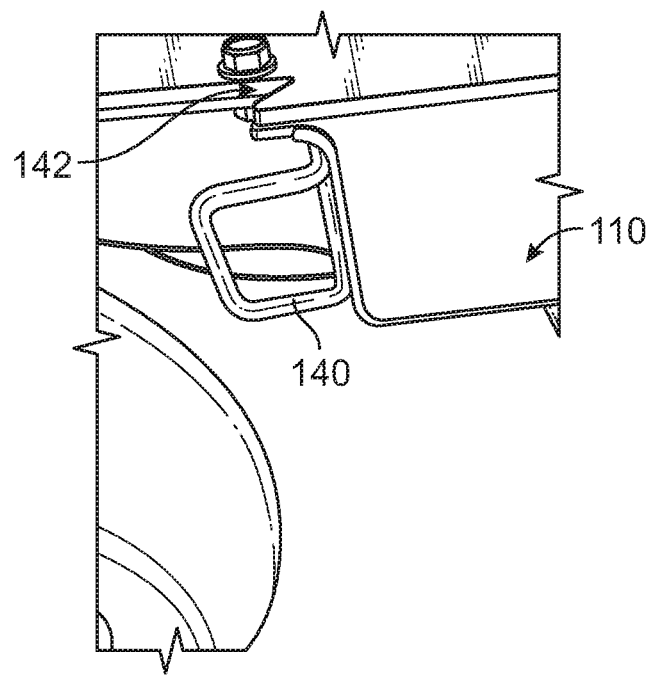
FIG. 12 is a view of a discharge bag hook and a lower notch of a chipper shredder according to an exemplary embodiment of the present disclosure.
Figure 13:
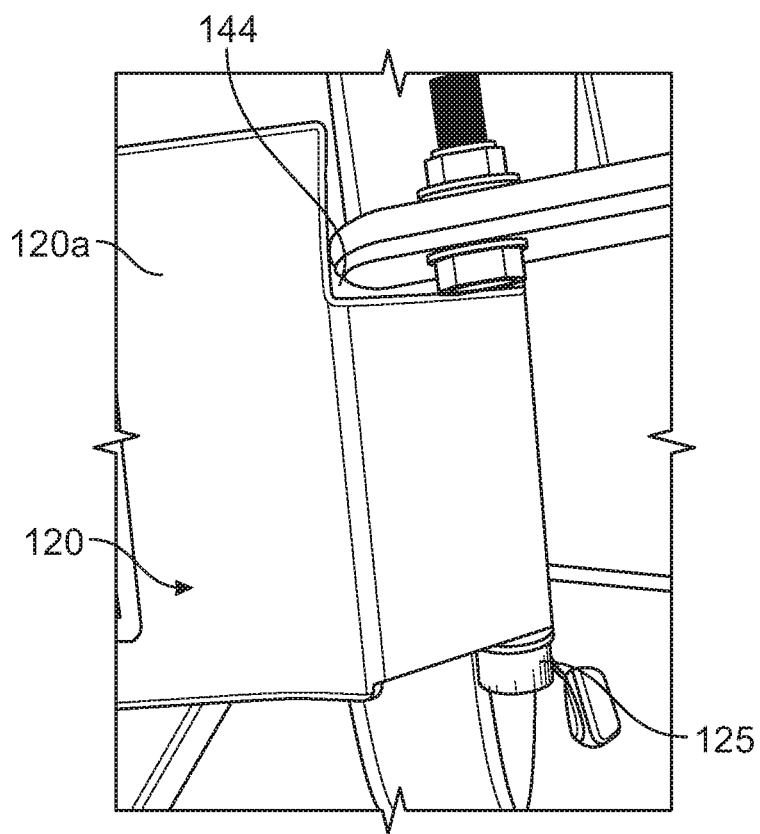
FIG. 13 is a view of a discharge port cover including a rabbet of a chipper shredder according to an exemplary embodiment of the present disclosure thereof.
Figure 14:
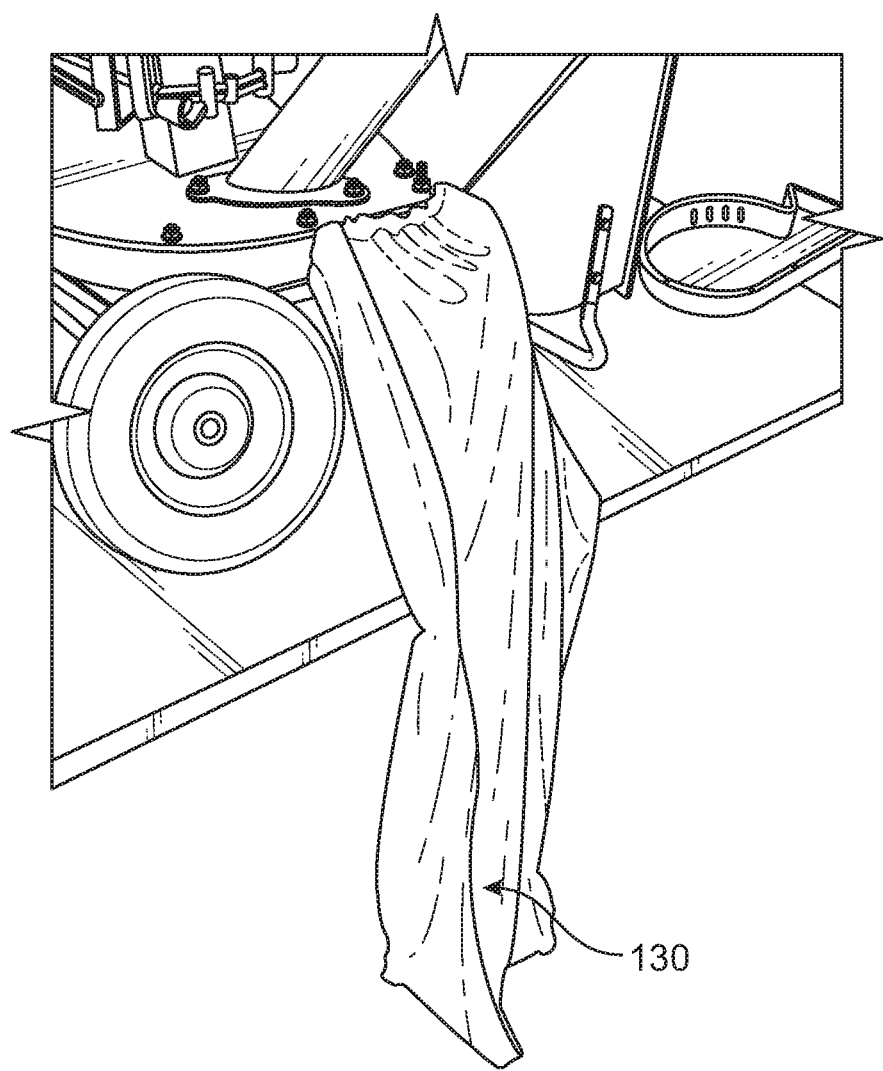
FIG. 14 is a view of a chipper shredder including a discharge port bag operationally affixed to the chipper shredder utilizing a discharge port bag retention assembly according to an exemplary embodiment of the present disclosure.

Referring to FIGS. 12-14, in some exemplary embodiments, the discharge assembly 100 can additionally include a retention mechanism for a discharge bag 130. For example, at the base of the discharge port 110, as shown in FIG. 12, there can be provided a hook or flange 140. On either side of the flange 140 a cleft 142 can be provided, that in cooperation with the flange 140 can provide support and retention for the discharge bag 130 at the lower part of the discharge port 110. As shown in FIG. 13, at the top of the discharge port cover 120, a rabbet 144 can be provided to receive another portion of the mouth of the discharge bag 130. The mouth of the discharge bag 130 when tightened and closed can thereby be retained by the flange 140 and cleft 142 combination at one end of the discharge port 110, and by the rabbet 144 at the discharge port cover 120 at the other end of the discharge port 110. The discharge bag 130 can thereby be securely, and removably, affixed to the chipper shredder 10 without slippage, as shown in FIG. 14.

In some exemplary embodiments, the chipper shredder 10 can be operated without a discharge bag, as the curved upper surface 120a can guide and pinpoint the location of the discharged material from the discharge port 110. In some exemplary embodiments, the curvature of the discharge port cover 120 can have the further advantage of prolonging the life of the discharge bag 130. When the chipper shredder 10 is used in conjunction with the discharge bag 130, the curvature of the discharge port cover 120 can direct the ejected material downwards to the bottom of the discharge bag 130. Because the ejected material is directed downwardly to the bottom of the discharge bag 130, material hits the discharge bag 130 only once and thereafter the ejected material is hitting, with force, the previously ejected material.

Various advantages of the chipper shredder 10 are provided by the exemplary embodiments of the present disclosure. For example, the chipper shredder 10 can provide a unique rotor disc assembly and parts, having unique hammer blades, L-blades, impeller blades, discharge port and discharge port cover, discharge bag attachment mechanism and tires. The chipper shredder 10 can provide a hammer blade for a chipper shredder that has a unique cutting edge, and a hammer blade that cuts material before that material is presented to other flanges in the device. The rotor disc for the chipper shredder 10 does not rely solely on an aperture behind the blade as the sole means of passing material from one side of the blade to the other. The rotor disc of the chipper shredder 10 can have a means for remnants of semi-processed material to not remain on the obverse side of the rotor disc and impede the chipper shredder process. The rotor disc of the chipper shredder 10 can eject material quickly and efficiently.

Additionally, the L-blades of the chipper shredder 10 can cut along its forward facing side. The L-blade, alone or in combination with other L-blades, can provide for efficient use of the motor and does not cause processed material to be held within the device rather than being discharged and ejected. The L-blade when used in combination with at least one other L-blade, can create an efficient use of space and material for the chipper shredder. The L-blades, and the rotor assembly, can provide for an efficient and slim main housing. The chipper shredder 10 can provide a mechanism to control and guide the discharge of the processed material. The chipper shredder 10 can provide a mechanism to affix a debris collection bag to the chipper shredder, and to securely and reliably affix, for the duration of the process, a debris collection bag to the chipper shredder 10. The chipper shredder 10 can provide for a unique tire and tire tread.

Various other considerations can also be addressed in the exemplary applications described according to the exemplary embodiments of the present disclosure. For example, various materials may be used to construct the elements described in the figures. Various sizes and dimensions of the elements can be provided, as well as shapes for the chipper shredder and its various components. Different numbers, positions and configurations of the impeller blades, L-blades and hammer blades can be provided according to the exemplary embodiments of the present disclosure.

The foregoing merely illustrates the principles of the disclosure. Various modifications and alterations to the described embodiments will be apparent to those skilled in the art in view of the teachings herein. It will thus be appreciated that those skilled in the art will be able to devise numerous apparatuses, arrangements, manufacture and methods which, although not explicitly shown or described herein, embody the principles of the disclosure and are thus within the spirit and scope of the disclosure. The disclosures of all documents and publications cited herein are hereby incorporated herein by reference in their entireties.

What is claimed is:

1. A chipper shredder, comprising:
   a rotor disc having a center, a circumference, an obverse side and a reverse side opposite the obverse side;
   one or more chipper blades provided on the obverse side;
   one or more impeller blades provided on a surface on the reverse side, the one or more impeller blades being perpendicular to the surface of the rotor disc;
   one or more hammer blades on the reverse side, the one or more hammer blades being perpendicular to the impeller blades; and
   one or more L-blades on the reverse side having one or more sharpened edges, wherein each of the L-blades extend in a direction away from the hammer blades and the surface of the rotor disc.

2. The chipper shredder according to claim 1, wherein the one or more hammer blades have at least one sharpened edge.

3. The chipper shredder according to claim 1, wherein at least one of the one or more L-blades have two sharpened edges.

4. The chipper shredder according to claim 1, wherein the one or more hammer blades are provided between the one or more L-blades and the one or more impeller blades.

5. The chipper shredder according to claim 4, wherein the one or more impeller blades are provided between the one or more hammer blades and the surface of the rotor disc.

6. The chipper shredder according to claim 1, wherein the one or more impeller blades extend from a first side at a circumferential edge at the circumference of the rotor disc to a second side towards the center of the rotor disc.

7. The chipper shredder according to claim 6, wherein the one or more impeller blades have a height that is greater at the second side than a height at the first side.

8. The chipper shredder according to claim 7, wherein the height of the one or more impeller blades gradually decreases from the second side to the first side.

9. The chipper shredder according to claim 1, wherein the one or more hammer blades are rotatably fixed on the reverse side of the rotor disc.

10. The chipper shredder according to claim 1, wherein the L-blades are fixed on the reverse side of the rotor disc.

* * * * *